United States Patent Office 3,746,558
Patented July 17, 1973

3,746,558
SUSPENSIONS OF HYDROPHOBIC STARCH ESTERS
Frans Berkhout, Vries, and Hermanus Johannes Wilhelmus Nieuwenhuis, De Krim, Netherlands, assignors to Scholten-Honig Research N.V., Foxhol, Netherlands
No Drawing. Filed July 9, 1971, Ser. No. 161,923
Claims priority, application Great Britain, July 14, 1970, 33,991/70
Int. Cl. C08b 27/22
U.S. Cl. 106—213
4 Claims

ABSTRACT OF THE DISCLOSURE

A stable colloidal aqueous suspension containing 50% by weight subgranular hydrophobic starch ester particles having a weight average size of 0.1–1.0 micron, the starch containing ester groups, in a proportion corresponding to a degree of substitution of 0.1–1.0, which consist of an aliphatic group of 3 to 17 carbon atoms and/or an aromatic group of 6–12 carbon atoms. The suspension is prepared by treating a granular starch ester under superatmospheric pressure and suddenly releasing the pressure. The suspensions can be used for coating paper, sizing yarns, and binding non-wovens.

---

This invention relates to new stable aqueous colloidal suspensions of hydrophobic starch derivatives, to methods of preparing such stable aqueous colloidal suspensions and to the application of such stable aqueous colloidal suspensions in certain coating operations.

In the patent literature monofunctionally substituted granular starch esters containing hydrophobic groups of at least 3 carbon atoms, such as starch butyrates, starch benzoates and starch phenyl carbamates, have been described. The degree of substitution (D.S.) of the monofunctionally ester-linked hydrophobic groups in these known granular, starch derivatives may be in the order of 0.01 to 0.05, in which case the derivatives may be gelatinized by cooking with water under atmospheric pressure. In fact these low-substituted hydrophobic starch esters will generally gelatinize at a lower temperature than the starch from which they were made. The known higher substituted granular hydrophobic monoesters of starch having a DS of 0.07 to 1.4 cannot be gelatinized when they are heated with water at 100° C. The granules settle out from the cooked suspensions and such suspensions have no practical use. These non-gelatinizable hydrophobic starch esters are used, however, for purposes where an inert finely divided organic material is suitable, for instance as fillers, extenders, absorbents, dusting powders and insecticide bases. We have found that non-gelatinizable granular hydrophobic starch monoesters having a degree of substitution of 0.1 to 1.0 can be dispersed in water by heating under superatmospheric pressure without being substantially hydrolyzed, while forming colloidal suspensions of subgranule particles of the hydrophobic starch ester, which are stable on standing and which suspensions have properties similar to those of natural and synthetic latices.

According to the invention we have now found a stable colloidal aqueous suspension of hydrophobic starch esters comprising from 1 to 50% based on the weight of the suspension of particles of hydrophobic starch esters having an average weight size of from 0.1 to 1.0 micron suspended in water, said hydrophobic starch containing ester groups in an amount corresponding with a degree of substitution of 0.1 to 1.0 which consist of an aliphatic group of 3 to 17 carbons atoms and/or an aromatic group of 6 to 12 carbon atoms. The suspensions differ from a normal starch dispersion in that they have a low viscosity and a low water retention and are opaque, because the starch particles are not substantially hydrated. When they are dried in the form of a thin layer spread on a surface they form clear films of increased water resistance. The average size of the starch granule fragments is in the range of 1 micron to 0.1 micron, as determined by turbidity measurements in a Beckman Spectrophotometer at 3750, 4500, 5000 and 5500 A. This method gives a weight average size. Particles somewhat larger than 1 micron, e.g. 3 microns, or smaller than 0.1 micron may be present.

The colloidal aqueous suspension of subgranule particles of hydrophobic starch esters can be obtained by heating under superatmospheric pressure a granular hydrophobic starch ester having a degree of substitution of 0.1 to 1.0 in water followed by a sudden release in pressure, to produce an aqueous suspension of hydrophobic starch particles of an average weight size of less than 1 micron. This process can be performed in a continuous pressure cooker operating with direct or indirect steam. It is also possible to mechanically shear and compress a granular hydrophobic starch ester, having a moisture content of 4 to 15% and a degree of substitution of 0.1 to 1.0 at a pressure substantially above atmospheric pressure with attendant heating to temperatures in the range of 100° C.–250° C. and forcing the worked mass through a restrictive opening accompanied by a sudden release in pressure. The fragmented product obtained by this process, which is described in our copending application Ser. No. 161,922, of even date, can be dispersed in water to form a stable suspension of hydrophobic starch particles of an average weight size of less than 1 micron by stirring them in water of ambient temperature up to a temperature of 100° C. In both these methods for preparing the stable colloidal suspensions of the hydrophobic starch monoesters the starch esters are heated to superatmospheric pressure in the presence of a larger or smaller amount of water and it could be expected that the esters would at least partially hydrolyse under these circumstances. We have found, however, that this does not substantially happen in case e.g. carboxylic and carbamate starch esters are used. This may be due to the relatively high pK of the corresponding acids which is generally higher than 4. Esterifying agents which may be used to produce granular hydrophobic starch monoesters are compounds which contain an aliphatic group of at least 3 carbon atoms up to 17 carbon atoms or an aromatic group containing at least 6 carbon atoms up to 12 carbon atoms and an active group which can form an ester link with starch, such as aliphatic or aromatic acid halides, acid anhydrides, vinyl esters or isocyanates. The ester link is preferably a carboxylic or a carbamate ester link.

Exemplary of suitable esterifying agents are: lauroyl chloride, stearoyl chloride, benzoyl chloride, benzene sulphonyl chloride, butyric anhydride, caproic anhydride, dodecenyl succinic anhydride, benzoyl anhydride, vinyl butyrate, vinyl 2-ethylhexoate, vinyl stearate, vinyl benzoate, isopropyl isocyanate, stearyl isocyanate, phenyl isocyanate, o-, m- or p-tolyl isocyanate, naphthyl isocyanate, o-, m- or p-halophenylisocyanate or tosyl isocyanate. It is also possible to use the reaction product of unsymmetrical diisocyanates and one molar proportion of a monohydroxy organic compound which is capable of blocking one of the isocyanate groups of the diisocyanate. Representative of such esterifying agents is the reaction product of toluene 2,4-diisocyanate and one molar proportion of a monohydric alcohol or a phenol or a monobasic carboxylic acid. The preferred esterifying agents are benzoyl chloride, benzoyl anhydride, vinylbenzoate and phenyl isocyanate. The aforesaid reagents are usually reacted under alkaline conditions at a relatively low alkali level, with starch, preferably with ungelatinized granular starch. The reaction may be conducted in the dry state or in suitable liquids, such as water or ketones, of which water is preferred. The reagents should be used in such an amount that the degree of substitution of the hydrophobic starch derivative is in the range of 0.1 to 1.0. A DS of 0.15 to 0.30 is preferred, when the hydrophobic group contains 6 or more carbon atoms. The hydrophobic starch esters are resistant to gelatinization and settle out from a suspension cooked at a temperature of 100° C.

Many of these estrifying agents have distinct advantages over the etherifying agents in that they react much more rapidly with starch. Whereas the etherification of starch in the granule form with an hydrophobic etherifying agent may take a reaction time of as long as 90 hours and may require in aqueous media the presence of a high amount of salt as a gelatinization inhibitor, the esterification of granular starch may be performed in a period of 1 to 4 hours, no gelatinization inhibitor being needed. This means that an esterification plant will discharge process water of a low salt content, thus abating pollution to a large extent in comparison with a plant where hydrophobic starch ethers are made. The starch from which the hydrophobic derivatives are made may be any known native starch, such as corn starch, waxy maize starch, high amylose maize starch, potato starch, sago starch, wheat starch, tapioca starch and rice starch. Instead of native starches we may use starches modified by acids, oxidants, heat, etherifying agents or esterifying agents, provided said modified starch has substantially maintained its starch character.

The suspensions can be made in a wide concentration range from as little as 1% to as high as 50% of dry substance in the suspension. They may be used in various commercial applications where their low viscosity, their low water retention, their non-migrating properties and their superior film-forming properties are of advantage.

As typical uses can be mentioned their application as a binder in starch-pigment coating colors for paper coating, especially on high-speed equipment, for which a weight average size of the granule fragments of 0.1 to 0.4 micron is preferred, and their application as a sizing agent for synthetic or glass fiber filament yarns, or as a binding agent in non-wovens, for which the preferred weight average size is 0.5 to 1 micron.

The preferred embodiments of the invention are further illustrated by the following examples:

EXAMPLE 1

200 parts by weight of corn starch are suspended in 220 parts by weight of water. The pH of the suspension is adjusted by the addition of 1 N aqueous sodium hydroxide to a value of 8.5. Then 30 parts by weight of phenyl isocyanate are added, the pH of the suspension being controlled by addition of 1 N aqueous sodium hydroxide, using an automatic titrator. After a period of 1 hour the pH remains constant and the suspension is neutralized and filtered. The granular hydrophobic starch ester thus obtained is washed and dried. The granular starch phenyl carbamate ester has a DS of 0.18 (bound nitrogen 1.37%). The granules of this hydrophobic starch ester do not gelatinize on cooking with water at 100° C.

When cooked in a continuous pressure cooker at a temperature of 150° C. a stable colloidal suspension is obtained having a relatively low viscosity at 20% concentration and containing small granule fragments, the weight average size of which is lower than 1 micron.

This suspension may advantageously be used as a binder in nonwovens.

EXAMPLE 2

This example shows the manufacture of a stable suspension of submicron sized particles of a benzoyl starch ester and the application of this suspension for the sizing of textile yarn, 3,000 parts by weight of corn starch are suspended in 3600 parts by weight of a 50/50 water-acetone mixture. The pH is adjusted to 10 by the addition of sodium hydroxide. Thereupon 610 parts of benzoyl chloride are added over a period of 4 hours, the pH being kept at 10 by addition of sodium hydroxide. The suspension is neutralized and filtered. The granular hydrophobic starch ester thus obtained is washed and dried. The granular starch benzoyl ester has a DS of 0.16 (9.16% benzoyl groups). The granules of this hydrophobic starch ester do not substantially gelatinize on cooking with water at 100° C.

An aqueous suspension of the granular ester is cooked in a continuous pressure cooker at a temperature of 145° C., thereby giving a stable colloidal suspension of relatively low viscosity at 17.5% concentration. It contains small granule fragments of starch benzoyl ester, of a weight average size lower than 1 micron.

This suspension is used in a concentration of 5 or 10% for the sizing of glass fiber yarns respectively of polyester yarns. The sizings obtained after drying are characterized by the fact that they have not substantially migrated.

We claim:

1. A stable colloidal aqueous suspension of hydrophobic starch esters comprising from 1 to 50%, based on the weight of the suspension, of particles of hydrophobic starch esters having an average weight size of from 0.1 to 1.0 micron suspended in water, said hydrophobic starch containing ester groups, in an amount corresponding with a degree of substitution of 0.1 to 1.0, which consist of an aliphatic group of 3 to 17 carbon atoms and/or an aromatic group of 6 to 12 carbon atoms.

2. A stable colloidal aqueous suspension according to claim 1 in which the hydrophobic starch ester is starch benzoyl ester.

3. A stable colloidal aqueous suspension according to claim 1 in which the hydrophobic starch ester is starch phenyl carbamate ester.

4. A stable colloidal aqueous suspension according to claim 1 in which the hydrophobic ester groups are present in an amount corresponding with a dgeree of substitution of 0.15 to 0.30 and contain an aliphatic group of 6 to 17 carbon atoms and/or an aryl and/or aralkyl group of 6 to 12 carbon atoms.

References Cited

UNITED STATES PATENTS

| | | | |
|---|---|---|---|
| 3,462,283 | 8/1969 | Hjermstad | 106—213 |
| 2,853,484 | 9/1958 | Loikema | 260—233.5 |
| 3,133,836, | 5/1964 | Winfrey | 127—71 |
| 3,137,592 | 6/1964 | Protzman | 127—32 |
| 2,562,978 | 8/1951 | Wolff | 260—209 X |

THEODORE MORRIS, Primary Examiner

U.S. Cl. X.R.

106—214; 117—126 GQ, 156; 260—233.5